United States Patent
Riise et al.

(10) Patent No.: US 9,359,482 B2
(45) Date of Patent: Jun. 7, 2016

(54) METHODS FOR REDUCING CONTAMINATION IN PLASTICS RECOVERED FROM DURABLE GOODS

(75) Inventors: Brian L. Riise, San Ramon, CA (US); Ron C. Rau, Gringley-on-the-Hill (GB); Michael B. Biddle, Walnut Creek, CA (US)

(73) Assignee: MBA Polymers, Inc., Richmond, CA (US)

(*) Notice: Subject to any disclaimer, the term of this patent is extended or adjusted under 35 U.S.C. 154(b) by 981 days.

(21) Appl. No.: 13/563,936

(22) Filed: Aug. 1, 2012

(65) Prior Publication Data

US 2013/0032167 A1     Feb. 7, 2013

Related U.S. Application Data

(60) Provisional application No. 61/514,216, filed on Aug. 2, 2011, provisional application No. 61/521,461, filed on Aug. 9, 2011.

(51) Int. Cl.
*C08J 11/06* (2006.01)
*B29B 17/02* (2006.01)
(Continued)

(52) U.S. Cl.
CPC .................. *C08J 11/06* (2013.01); *B29B 17/02* (2013.01); *B29B 2017/0203* (2013.01); *B29B 2017/0293* (2013.01); *B29K 2023/06* (2013.01); *B29K 2023/12* (2013.01); *B29K 2025/06* (2013.01); *B29K 2055/02* (2013.01);
(Continued)

(58) Field of Classification Search
CPC ............ B29B 17/02; B29B 2017/0203; B29B 2017/0293; C08J 11/06; B29K 2105/065; B29K 2023/06; B29K 2023/12; B29K 2025/06; B29K 2055/02; B29K 2223/086; B29K 2077/00; Y02W 30/701; Y02W 30/622
USPC .......... 521/40–49.8; 528/480–503; 134/5, 10, 134/19
See application file for complete search history.

(56) References Cited

U.S. PATENT DOCUMENTS

| | | | |
|---|---|---|---|
| 4,830,188 A | 5/1989 | Hannigan et al. | |
| 6,997,407 B1 * | 2/2006 | Hayward ................ | B29B 17/02 241/17 |

(Continued)

FOREIGN PATENT DOCUMENTS

| | | |
|---|---|---|
| DE | 19510923 B4 | 10/1996 |
| DE | 19643603 A1 | 4/1998 |

(Continued)

OTHER PUBLICATIONS

International Preliminary Report on Patentability for PCT/US2012/049173, mailed Feb. 13, 2014, 6 pages.

(Continued)

*Primary Examiner* — Frances Tischler
(74) *Attorney, Agent, or Firm* — Fish & Richardson P.C.

(57) ABSTRACT

A process for reducing the content of residual organic substances in mixtures of plastics from durable goods can include separating a feed stream into two or more mixtures of flakes and preforming a cleaning process to remove a portion of one or more of the absorbed organic substances from one or more of the mixtures. Each mixture can contain one or more plastic types and at least one organic substance absorbed into the one or more plastic types. The flakes in the mixtures can have an average particle diameter of less than 10 millimeters.

14 Claims, 1 Drawing Sheet

(51) Int. Cl.
    *B29K 105/06*     (2006.01)
    *B29K 23/00*      (2006.01)
    *B29K 25/00*      (2006.01)
    *B29K 55/02*      (2006.01)
    *B29K 77/00*      (2006.01)

(52) U.S. Cl.
    CPC ...... *B29K 2077/00* (2013.01); *B29K 2105/065* (2013.01); *B29K 2223/086* (2013.01); *Y02W 30/622* (2015.05); *Y02W 30/701* (2015.05)

(56) References Cited

U.S. PATENT DOCUMENTS

| | | |
|---|---|---|
| 7,802,685 B2 | 9/2010 | Allen et al. |
| 2006/0219276 A1 | 10/2006 | Bohnert et al. |
| 2009/0281203 A1 | 11/2009 | Riebel |
| 2011/0245457 A1* | 10/2011 | Rougelot ............... B29B 17/02 528/486 |

FOREIGN PATENT DOCUMENTS

| | | |
|---|---|---|
| EP | 1849822 B1 | 9/2008 |
| JP | S49-128542 | 12/1972 |
| JP | 51047180 B1 | 12/1976 |
| WO | WO9215640 A1 | 9/1992 |
| WO | WO0121373 A1 | 3/2001 |
| WO | WO0183112 A1 | 11/2001 |
| WO | WO03086733 A1 | 10/2003 |
| WO | WO03087215 A1 | 10/2003 |
| WO | WO2008017843 A1 | 2/2008 |

OTHER PUBLICATIONS

International Search Report and Written Opinion; Nov. 27, 2012; World Intellectual Property Organization (WIPO) (International Bureau of); PCT/US2012/049173; 9 pages.

* cited by examiner

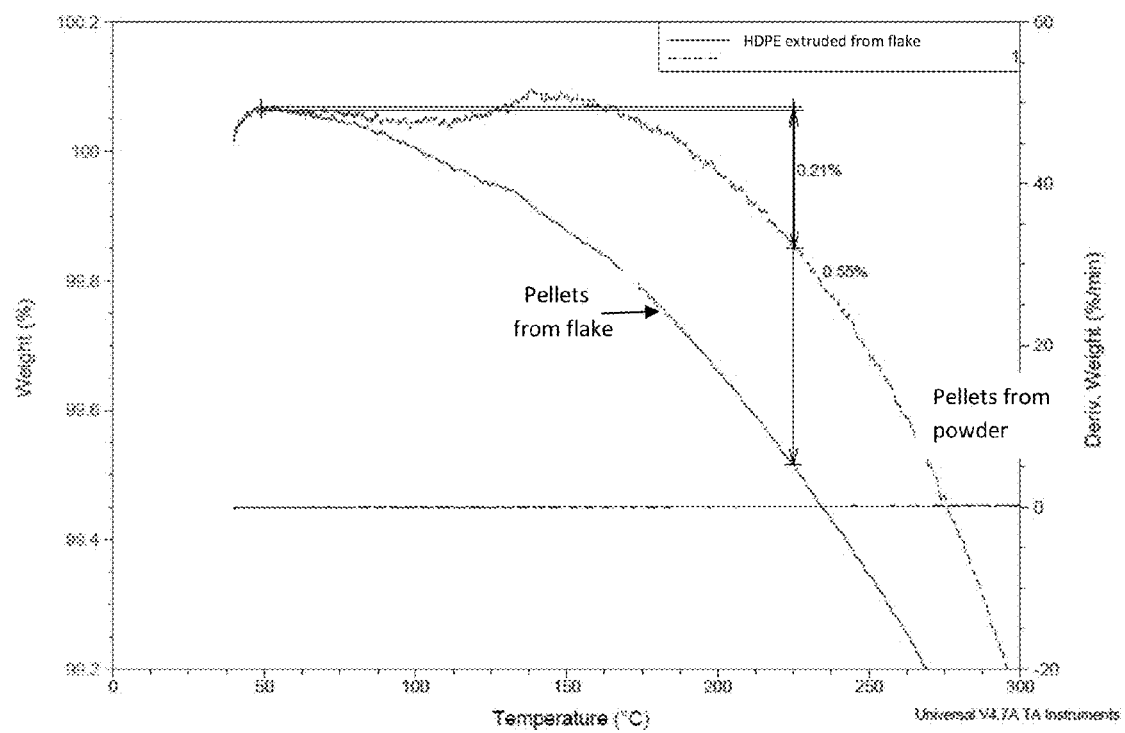

METHODS FOR REDUCING CONTAMINATION IN PLASTICS RECOVERED FROM DURABLE GOODS

CLAIM OF PRIORITY

This application claims priority under 35 USC §119(e) to U.S. Provisional Application Ser. No. 61/514,216, filed on Aug. 2, 2011 and U.S. Provisional Application Ser. No. 61/521,461 filed on Aug. 9, 2011, the entire contents of which are hereby incorporated by reference.

TECHNICAL FIELD

This disclosure relates to material separations, including recycling plastics from streams of waste plastics and other materials.

BACKGROUND

Products made from or incorporating plastic are a part of almost any work place or home environment. Generally, the plastics that are used to create these products are formed from virgin plastic materials. That is, the plastics are produced from petroleum and are not made from existing plastic materials. Once the products have outlived their useful lives, they are generally sent to waste disposal or a recycling plant.

Recycling plastic has a variety of benefits over creating virgin plastic from petroleum. Generally, less energy is required to manufacture an article from recycled plastic materials derived from post-consumer and post-industrial waste materials and plastic scrap (collectively referred to in this specification as "waste plastic material"), than from the comparable virgin plastic. Recycling plastic materials obviates the need for disposing of the plastic materials or product. Further, less of the earth's limited resources, such as petroleum and polymers, are used to form virgin plastic materials.

When plastic materials are sent to be recycled, the feed streams rich in plastics may be separated into multiple product and byproduct streams. Generally, the recycling processes can be applied to a variety of plastics-rich streams derived from post-industrial and post-consumer sources. These streams may include, for example, plastics from office automation equipment (printers, computers, copiers, etc.), white goods (refrigerators, washing machines, etc.), consumer electronics (televisions, video cassette recorders, stereos, etc.), automotive shredder residue (the mixed materials remaining after most of the metals have been sorted from shredded automobiles and other metal-rich products "shredded" by metal recyclers), packaging waste, household waste, building waste and industrial molding and extrusion scrap.

Different types of plastic parts are often processed into shredded plastic-rich streams. The variety of parts can vary from a single type of part from a single manufacturer up to multiple families of part types. Many variations exist, depending on at least the nature of the shredding operation. Plastics from more than one source of durable goods may be included in the mix of materials fed to a plastics recycling plant. This means that a very broad range of plastics may be included in the feed mixture. Some of the prevalent polymer types in the waste plastic materials derived from the recycling of end-of-life durable goods are acrylonitrile-butadiene-styrene (ABS), high impact polystyrene (HIPS), polypropylene (PP), polyethylene (PE) and polycarbonate (PC), but other polymers may also be present.

Mixtures of recycled plastic materials can sometimes contain residual organic materials such as petroleum derived liquids (e.g. gasoline or diesel fuel, various lubricating oils, brake fluids, windshield washing fluids and other fluid residues) and polychlorinated biphenyls (PCBs). Such contaminants can occur on the surface and interior of the plastic pieces. These organic materials can result in problems with the end products, such as odors, difficulties with melt processing and environmental concerns.

End users require products meeting their requirements for odor, volatiles emissions and limits for PCBs, but market and legislative forces are encouraging manufacturers to incorporate post-consumer plastics into their products.

In order to satisfy these requirements, it is important to identify and implement appropriate methods to reduce the content of residual organic materials in plastics recovered from mixtures of post-consumer durable goods.

In the following, methods are described for the selective reduction of the content of organic contaminants in mixtures of plastic flakes.

SUMMARY

Methods are described for reducing the content of residual organic substances in mixtures of plastics from durable goods. A process for reducing the content of residual organic substances in mixtures of plastics from durable goods can include separating a feed stream into two or more mixtures of flakes and preforming a cleaning process to remove a portion of one or more of the absorbed organic substances from one or more of the mixtures. Each mixture can contain one or more plastic types and at least one organic substance absorbed into the one or more plastic types. The flakes in the mixtures can have an average particle diameter of less than 10 millimeters.

BRIEF DESCRIPTION OF THE DRAWINGS

FIG. 1—Thermogravimetric analysis of pellets extruded from flake and from flake milled to smaller than 800 microns

DETAILED DESCRIPTION

This application describes methods for reducing the content of residual organic materials in recycled plastics. In some embodiments, the organics can be removed in a single step using a single system or device. In some embodiments, these methods, systems, and devices can be used in multiple locations in the process.

Accordingly, in the following, we describe methods, systems and devices for the removal of residual organic materials from plastic flakes.

A recycling plant for the recovery of plastics from durable goods typically includes a number of process steps. For example, U.S. Pat. No. 7,802,685 describes various sequences of various process steps for the removal of non-plastics and the separation of the various plastic types from streams containing mixtures of plastics from durable goods. The methods, systems, and devices described herein can be used in sequence with or in substitution for the various process steps described in U.S. Pat. No. 7,802,685, which is hereby incorporated by reference. Theses sequences of processes apply to both streams derived from durable goods and to streams of packaging materials, bottles or other mixtures rich in plastics. The process can include the use of one or more size reduction steps performed on a plastics-rich mixture from durable goods. The feed mixture can be shredded material from which some metal has been removed. The durable goods themselves can be size reduced two or more times prior to extrusion.

A mixture rich in plastic material can be processed through size reduction equipment one or more times. The size reduction steps may include rotary grinding, a hammermill, shredding, granulation, or any other size reduction processes known by those skilled in the art.

The mixture rich in plastic flakes can be processed through one or more density separation processes. These density separation processes can occur in water at a density cut point of 1.0, or in aqueous salt solutions or aqueous suspensions of solid particles with density cut points greater than 1.0, for example as described in U.S. Pat. No. 7,802,685. The plastic-rich mixture may also contain rubber, wood and other non-plastics. The flakes can range in size from around 1 mm to around 50 mm, although the process works best when the particles are between about 2 mm and about 10 mm. Size reduction, in some embodiments, can precede the density separation processes. In other embodiments, size reduction can also follow the density separation process to create a final flake size between about 2 mm and about 10 mm.

The density separations may be carried out in any of the types of density separation equipment. For example, hydrocyclones can efficiently separate materials of different densities based on the high centrifugal forces present in the liquid slurry swirling inside a cyclone.

An appropriate rinsing step can be used after elevated density separations. The rinsing step may contain, for example, small water jets that are designed to rinse the majority of the salt solution or suspended particles off the materials in the plastic-rich flake mixture.

The mixtures can also be dried in a controlled manner after the density separations. Flake materials tend to adhere to surfaces if they are overly damp or wet, and this can result in poor separation performance for some of the processes described herein.

Two product streams can be recovered from each density separation process. One or both of these product streams may be further processed to recover high purity plastics. Each product from the density separation often contains two or more types of plastics and small amounts of non-plastics. Such a product therefore requires further purification steps, as described in U.S. Pat. No. 7,802,685. These purification steps typically include processes relying on a narrow surface to mass distribution which are preceded by surface to mass control operations.

After purification of the plastics by type (and also sometimes grade), the material can be melt compounded. The flake to be melt compounded can be blended prior to extrusion in order to improve product uniformity. The product from melt compounding can be pellets, sheet or other profile shape (e.g. a board).

Plastics recovered from mixtures of durable goods can contain residual organic materials that should ideally be removed from the flakes prior to their formation into pellets or molded part. Such residual organics can include, for example, residual fuels from automobile fuel tanks, residue from radiators, residue from windshield wiper fluid containers, adhesives, or polychlorinated biphenyls (PCBs).

Automobile fuel tanks are often made of plastics and can contain layers of high density polyethylene (HDPE) along with barrier materials such as ethylene vinyl alcohol (EVOH, which is a copolymer containing ethylene and vinyl alcohol repeat units), polyamides or other barrier materials, and adhesives to attach the barrier material to the HDPE. The plastics from fuel tanks can contain gasoline and diesel fuels on the plastic surface as well as gasoline and diesel fuels that have absorbed into the plastic over the life of the automobile.

Plastics from durable goods, especially those derived from streams of end-of-life vehicles (ELV), can contain PCBs at concentrations higher than allowed by some customers or by the legislation of some countries. PCBs can be found in these streams because automobile shredders sometimes process electrical transformers or other equipment that can contain small amounts of PCBs.

Other undesirable organic materials may also be present in the recovered plastics. For example, aldehydes, ketones or carboxylic acids produced by oxidation of additives or residual monomers in the plastic can result in undesirable odors in the end product. Because of the long lifetime and multiple heat histories of the recovered plastic pieces, the amounts of these compounds and the resulting odors can be much stronger than found in virgin plastics.

In addition to odors or environmental concerns about organic contaminant molecules in recovered plastics, the contaminants can also cause difficulties during the extrusion step itself. During the extrusion of HDPE recovered from ELVs, for example, residual fuels in the HDPE fuel tanks can vaporize resulting in bubble formation in pellets or other extrusion products. These bubbles result in large and low density pellets, and end products manufactured from these pellets (e.g. by injection molding or blow molding) can have a poor surface appearance and can contain voids that result in mechanical failures.

The processes described herein can be used to reduce the levels of organic contaminants in the recovered plastic flakes. Such methods include heating the plastics to volatilize the organic contaminants, extraction of organic contaminants with solvents (including supercritical fluids), cleaning the organic contaminants from the polymer surface using aqueous surfactant solutions, cleaning the organic contaminants from the polymer surface using commercial cleaning equipment with or without surfactants, or heating the organic contaminants using microwaves or other radiation that preferentially heats the organic contaminants compared with the plastic itself.

Methods of heating the plastic can include heating the plastic flakes under vacuum or with a continuous flow of air or nitrogen to ensure that volatiles are efficiently removed. Heating of the material can be in a sealed container (if under vacuum) in batches, in a continuous operation where the flakes are conveyed in a blending operation using hot air to convey the flakes, or in a fluidized bed with hot air.

Processes to remove residual organic contaminants can be improved by increasing the surface area to mass ratio of the plastic material. The smallest size plastic flakes just prior to extrusion (typically between about 2 mm and about 10 mm) have a greater surface to mass ratio than larger sized plastic flakes directly after shredding.

Methods such as milling the flakes to under about 1 mm can greatly increase the surface area as well as provide heating of the material. Such processes should therefore be considered as a method to remove residual organics from plastics recovered from durable goods. Example 1 provides an example of such a process.

In addition to its utility in driving off volatiles, milling can liberate small fragments of metal, glass or sand that have embedded in the plastic flakes. These liberated fragments can then be separated from the plastic. Milling may also benefit the recycling process by a large increase in surface to mass which may enable more efficient purification in an electrostatic separator, high pressure dense medium, and under the force of a magnet. Milling can also create stratification of different materials in different size ranges. Low density polyethylene (LDPE) will generally remain as larger particles after milling compared with HDPE. HIPS and ABS can become much smaller than LDPE or HDPE because they are more brittle.

Milling can also facilitate the removal of EVOH, polyamides or other barrier materials, and adhesives that attach the barrier material to the HDPE in fuel tanks. These barrier layers and adhesives can cause problems for the product quality of the HDPE after extrusion if they are not separated from the HDPE. Milling can liberate a portion of the HDPE from the barrier layers and adhesives, though, and the milled materials (smaller than about 1 mm) can be separated from each other using methods such as density separation or electrostatic separation.

Density separation may be useful for the separation of HDPE from the barrier materials because the specific gravity of HDPE is well below 1.0 while the specific gravities of EVOH (1.1 to 1.2, depending on the ethylene content) and polyamides (approximately 1.14 for PA66 or PA6) are well above 1.0. Density separation in systems capable of processing small particles may therefore be suitable for separating HDPE from the barrier layers, with HDPE floating in water and pieces rich in the barrier layers sinking in water.

Electrostatic may also be useful for the separation of HDPE from the barrier materials. Polyamides tend to charge positive relative to HDPE, and EVOH should also charge quite differently from HDPE, so it should be possible to easily separate these materials. This is especially true since the surface area per mass of the milled particles is so large.

The removal of organic contaminants from recovered plastics preferentially occurs after the plastic type has been separated from other plastics. The reasons for this are that 1) each type of plastic can contain different levels and types of problematic organic contaminants and 2) each type of plastic has different thermal or chemical properties that can affect the selection of the method and process parameters for the removal of organic contaminants. In other embodiments, the organic contaminants are removed prior to the full separation of different plastic types or on mixtures of two or more plastic types Each type of plastic recovered from mixtures of durable goods can contain a different assortment of residual organic contaminants. Contaminant residues are preferentially found in some plastics prior to shredding, for example, whereas other plastic types contain fewer or different contaminant types. Processes and methods used to remove organic contaminants can be quite expensive, so it is desirable for the processes to be employed primarily for plastics that require the removal of contaminants. Some plastics may not need such processing, whereas others may need two or more different types of processing to remove different types of contaminants. It is therefore often better to employ the contaminant removal process after plastics have been separated rather than on the entire mixture of plastics.

Processes to remove organic contaminants can sometimes be carried out at high temperatures in order to increase the volatility of the residual organic contaminants. In some embodiments, flakes or pellets are dried out at temperatures below the melting temperature (for semicrystalline polymers) or glass transition temperature (for amorphous polymers) of the plastic flakes or pellets in order to avoid agglomeration of the flakes or pellets. The maximum temperature of such processes can be limited to the lowest glass transition or melting temperature of flakes in a mixture of several plastic types, so it is desirable to perform such operations after the separation of plastic flakes into individual plastic types. After such a separation, some streams can be heated to temperatures higher than others.

The chemical nature of different plastics also allows for different behaviors of the plastic under the influence of solvents. Solvents can be used to dissolve the organic contaminants to extract them from the plastics, but the flake mixture will be difficult or impossible to convey to downstream processes if the solvent dissolves any plastic flakes or pellets. Separating the plastic flakes into pure streams of each plastic type can enable the use of solvents selected for their ability to dissolve the contaminants without greatly affecting the plastic itself.

The chemical nature of the surfaces of the different plastics means that different levels of organic contaminants may be present on the surfaces of different plastic types. Solvents or aqueous surfactant solutions that can solubilize organic contaminants on the plastic surface may be employed on streams of plastic flakes where higher levels of the surface contaminants exist.

Solvents that can be useful for removing contaminants can include, but are not limited to, biodegradable bio-derived solvents such as alkyl lactates (e.g. ethyl lactate), common solvents such as hexane, acetone, tetrahydrofuran, xylene, liquid or supercritical $CO_2$, or combinations of solvents used at the same time or sequentially. The one or more solvents selected should dissolve and remove the contaminant without dissolving the plastic.

Surfactants that can be useful for removing contaminants can include, but are not limited to, certain grades of Triton™ RW series alkylamine ethoxylates (Dow Chemical Company, Midland, Mich., USA), nonionic surfactants such as some of the Tergitol™ alcohol ethoxylates (Dow Chemical Company, Midland, Mich., USA), and others. The surfactant should be selected to best remove the organic contaminants of interest. The chemical nature of different plastics also allows for different behaviors of the plastic under the influence of electromagnetic radiation. Microwaves or other electromagnetic radiation may preferentially excite residual organic molecules, heating the residual organic molecules instead of the polymer itself. If several polymer types are present, though, the radiation is likely to interact with some of the polymer types. Interaction of radiation such as microwaves can heat the polymer to temperatures above their melting temperature (for semicrystalline polymers) or glass transition temperature (for amorphous polymers). Separating the plastic flakes into pure streams of each plastic type can enable the use of electromagnetic wavelengths selected for their ability to heat up the contaminants without heating the plastic itself.

Some of the organic contaminants are present at higher concentrations near the polymer surface, so it is possible to reduce their concentrations by intensive washing. The washing may be carried out in water alone, in water containing surfactants, or in solvents capable of dissolving the organic contaminants found on the plastic surface. The washing may be accomplished by mechanical agitation in equipment such as screw conveyors or rotating drums, in centrifuges, or in systems using ultrasonic cleaning.

Having several process lines to remove organic contaminants for multiple types of plastics might be more costly than such a process for a larger volume of mixed plastics, though, so it may be possible to perform a cleaning step on particular intermediate flake mixtures. This is especially true if the mixtures have similar thermal or chemical properties and if they contain similar organic contaminants. It might make sense to process mixtures of ABS and HIPS in a thermal drying process, for example, since they have similar glass transition temperatures.

Organic contaminants can also be removed during the extrusion step by the use of vacuum devolatilization equipment commonly used in the plastics industry. The molten plastic in a section of the extruder screw with a low pressure is made into a thin film exposed to a vacuum. The vacuum extracts residual moisture along with any organic contaminants of sufficient volatility at the melt temperature in this zone of the extruder. Since this melt temperature is well above the melting temperature (for semicrystalline polymers) or glass transition temperature (for amorphous polymers) of the plastic, this provides a good opportunity to reduce the concentration of semi-volatile organics from the plastic.

Other equipment designed to remove monomers to very low levels, such as wipe film evaporators, can also be employed to remove as much residual organic contamination as possible from the molten plastic during the extrusion step.

After the extrusion step and formation of pellets, residual organic materials can be further removed from the plastic by operations such as thermal treatment, treatment with microwave or other radiation to preferentially heat and remove the residual organics, or extraction of the organics with solvents (especially supercritical fluids).

The various processes to reduce the levels of residual organic contaminants in plastics recovered from durable goods can be accomplished in one or more steps. Because a single process step is unlikely to remove all of the contaminants, multiple steps of the same process or combinations of processes can be used until marketing or environmental targets are achieved.

Organic contaminants can be removed in at least three steps using the following sequence of processes. In the first step, a solvent is added to dissolve the organic contaminant. In the second step, most, but not all of the solvent and organic contaminant are removed from the polymer. The second step can include screening to drain off the solvent, or drying in a device such as a spin drier. The amount of solvent remaining is greater than 0.1% by weight of the mixture of flakes. In some embodiments, the amount of solvent remaining is greater than 1% by weight of the mixture of flakes. In other embodiments, the amount of solvent remaining is greater than 2% by weight of the mixture of flakes. In the this step, the product flakes with some residual solvent may then be melt compounded with vacuum devolatilization to remove the solvent and the organic contaminant. The presence of the solvent in the melt can improve the removal of the organic contaminant from the melt compared with vacuum devolatilization in the absence of a solvent.

Organic contaminants can be removed in at least three steps using the following sequence of processes. In the first step, an aqueous surfactant solution is added to remove the organic contaminant from the polymer surface. In the second step, most, but not all of the aqueous surfactant solution and organic contaminant are removed from the polymer. The second step can include screening to drain off the aqueous solution, or drying in a device such as a spin drier. The amount of aqueous solution remaining is greater than 0.1% by weight of the mixture of flakes. In some embodiments, the amount of aqueous solution remaining is greater than 1% by weight of the mixture of flakes. In other embodiments, the amount of aqueous solution remaining is greater than 2% by weight of the mixture of flakes. In the third step, the flake product with some residual aqueous surfactant may then be melt compounded with vacuum devolatilization to remove the surfactant, water vapor and the organic contaminant. The presence of the surfactant and water vapor in the melt can improve the removal of the organic contaminant from the melt compared with vacuum devolatilization in the absence of these components.

In cases where odors cannot be completely removed to the desired end point, it is possible to melt compound into the plastic activated carbon or molecular sieves to reduce the odor of the plastic product. The organic contaminant still remains in the plastic, but it is trapped such that it cannot be easily detected during the normal use of the plastic.

The following examples illustrate various methods for reducing the amount of organic contaminants in recovered plastics.

EXAMPLES

The following examples demonstrate the effectiveness of methods for reducing the organics content of plastic-rich mixtures derived from durable goods.

Example 1

Milling of HDPE Flakes to Reduce the Level of Volatiles

A mixture of primarily HDPE flakes from a source of ELVs was milled to a top size less than 800 microns. The temperature of the powdered material during the milling process reached approximately 85-95° C. The powdered material was then extruded and pelletized.

FIG. 1 shows results from the thermogravimetric analysis (TGA) of these pellets compared with pellets produced from flakes that had not undergone the milling process. At temperatures near the extrusion temperature (200-230° C.), the pellets produced from the milled flakes have less than half of the volatiles of pellets extruded from flakes.

Example 2

Levels of PCBs in Different Plastics

Three types of flake products were recovered from a single European automobile recycler's shredder residue (ABS, HIPS and a blend of PP and HDPE). After extrusion, we determined that the levels of PCBs in the products were different for each plastic type, as shown in Table 2.1.

If the maximum allowable concentration of PCBs in plastic products is 2 ppm, then, at least for this particular example, only the PP/HDPE blend would need to be processed using a method suitable for removing the PCBs. The ABS and HIPS products would not require such processing.

TABLE 2.1

Levels of PCBs in plastics recovered from shredded ELVs

| Plastic type | PCB concentration (ppm) |
|---|---|
| ABS | 0.2 |
| HIPS | 0.1 |
| PP/HDPE blend | 7.2 |

The invention claimed is:

1. A process for reducing the content of residual organic substances in mixtures of plastics from durable goods comprising separating a feed stream into two or more mixtures of flakes, each mixture containing one or more plastic types and at least one organic substance absorbed into the one or more plastic types, wherein the flakes in the mixtures have an average particle diameter of less than 10 millimeters; and performing a cleaning process to remove a portion of one or more of the absorbed organic substances from one or more of the mixtures, the cleaning process comprising:
milling the one or more of the mixtures such that the one or more mixtures reach a temperature ranging from about 85° C. to about 95° C.; and
extruding the one or more mixtures at a temperature ranging from about 200° C. to about 230° C.

2. The process according to claim 1, wherein the heating is accomplished by milling the mixture to an average particle size below about 1 mm.

3. The process according to claim 1, further comprising pelletizing at least one of the mixtures.

4. The process according to claim 3, wherein an additional cleaning process is performed on the pelletized mixture, wherein the additional cleaning process comprises extruding.

5. The process according to claim 1, wherein the one or more of the mixtures includes at least one of ABS, HIPS, PP and HDPE.

6. The process according to claim 1, wherein organic substances in the one or more of the mixtures include hydrocarbon residues from petroleum products.

7. The process according to claim 1, wherein organic substances in the one or more of the mixtures include polychlorinated biphenyls.

8. The process according to claim 1, wherein the one or more of the mixtures are heated under a vacuum.

9. The process according to claim 3, wherein heated air is passed through the one or more of the mixtures after milling, after extrusion, or both.

10. The process according to claim 1, further comprising separating a main polymer from contaminant polymers.

11. The process of claim 10, where the main polymer is HDPE and the contaminant polymers are EVOH or polyamides.

12. The process of claim 1, wherein the extruding of the one or more mixtures occurs at temperature of about 200° C.

13. The process according to claim 8, wherein the one or more of the mixtures are heated under the vacuum after milling, during extrusion, after extrusion, or combinations thereof.

14. A process for reducing the content of residual organic substances in mixtures of plastics from durable goods comprising:
separating a feed stream into two or more flake mixtures such that each flake mixture contains one or more plastic types, at least one organic substance absorbed into the one or more plastic types, wherein the at least one organic substance includes hydrocarbon residues from petroleum products, and wherein flake mixture comprises flakes having an average particle diameter of less than 10 millimeters;
separating a main polymer from a contaminant polymer, the main polymer comprising HDPE, HIPS, ABS, PP, or combinations thereof, the contaminant polymer comprising EVOH, polyamides, or both; and
performing a cleaning process to remove a portion of one or more of the absorbed organic substances from one or more of the mixtures, the cleaning process comprising:
milling the one or more mixtures such that the one or more of the mixtures reach a temperature ranging from about 85° C. to about 95° C.;
extruding the one or more mixtures at a temperature ranging from about 200° C. to about 230° C.; and
pelletizing at least one or more mixtures during or after the extruding.

* * * * *